United States Patent [19]

Gill

[11] Patent Number: 5,380,361
[45] Date of Patent: Jan. 10, 1995

[54] MODIFIED FILLER MATERIAL FOR ALKALINE PAPER AND METHOD OF USE THEREOF IN ALKALINE PAPER MAKING

[75] Inventor: Robert A. Gill, Bethlehem, Pa.

[73] Assignee: Minerals Technologies, Inc., New York, N.Y.

[21] Appl. No.: 30,992

[22] Filed: Mar. 12, 1993

[51] Int. Cl.[6] .............................................. C09C 1/02
[52] U.S. Cl. .................................. 106/465; 106/442; 106/447; 501/148
[58] Field of Search ............... 106/442, 447, 464, 465; 501/148

[56] References Cited

U.S. PATENT DOCUMENTS

| | | | |
|---|---|---|---|
| 1,839,449 | 1/1932 | Sutermeister et al. | 106/306 |
| 1,993,750 | 3/1935 | Raften | 134/23 |
| 2,385,379 | 9/1945 | Raften | 106/306 |
| 3,597,251 | 8/1971 | Kaufman | 106/306 |
| 4,753,679 | 6/1988 | Damiano | 106/95 |
| 4,892,590 | 1/1990 | Gill et al. | 106/214 |
| 5,000,791 | 3/1991 | Tokarz et al. | 106/463 |
| 5,043,017 | 8/1991 | Passaretti | 106/464 |
| 5,147,507 | 9/1992 | Gill | 162/158 |

FOREIGN PATENT DOCUMENTS

59-228098 12/1984 Japan .

OTHER PUBLICATIONS

T. Arnson et al., The Sizing Of Paper, 2nd Ed., ch. 5, "Internal Sizing With Stearic Acid", pp. 79-86 (Tappi Press, 1989) no month.
Kirk–Othmer Encyclopedia of Chemical Technology, 4rth Ed., vol. 4, "Calcium Compounds", pp. 430-431 (John Wiley & Sons 1992) no month.
Kirk–Othmer Encyclopedia of Chemical Technology, 3rd Ed., vol. 17, "Pigments (Inorganic)", pp. 807-810 (John Wiley & Sons 1982) no month.
Morrison & Boyd, Organic Chemistry, 3rd Ed., ch. 18, "Carboxylic Acids", p. 597 (Allyn and Bacon Inc. 1973) no month.

*Primary Examiner*—Helene Klemanski
*Assistant Examiner*—Chris Gallo
*Attorney, Agent, or Firm*—Pennie & Edmonds

[57] ABSTRACT

A hydrophobic filler material for alkaline paper is disclosed. The filler material comprises finely divided particles of an inorganic material, a majority of particles having a surface all of which is substantially modified with a water soluble $C_{12}$–$C_{22}$ fatty acid salt and a metal ion in an amount at least effective to complex all of the fatty acid salt present. An alkaline paper is disclosed. The alkaline paper comprises a hydrophobic filler material comprising finely divided inorganic material, a majority of particles having substantially all of their surface being modified with a water soluble $C_{12}$–$C_{22}$ fatty acid salt. A method for improving sizing of alkaline paper is disclosed, comprising preparing a filler material and adding the same to cellulose fiber. The filler material is prepared by selecting finely divided particles of an inorganic material and substantially modifying all of the surface of a majority of the particles with a $C_{12}$–$C_{22}$ fatty acid salt, forming a hydrophobic coating thereon.

43 Claims, 2 Drawing Sheets

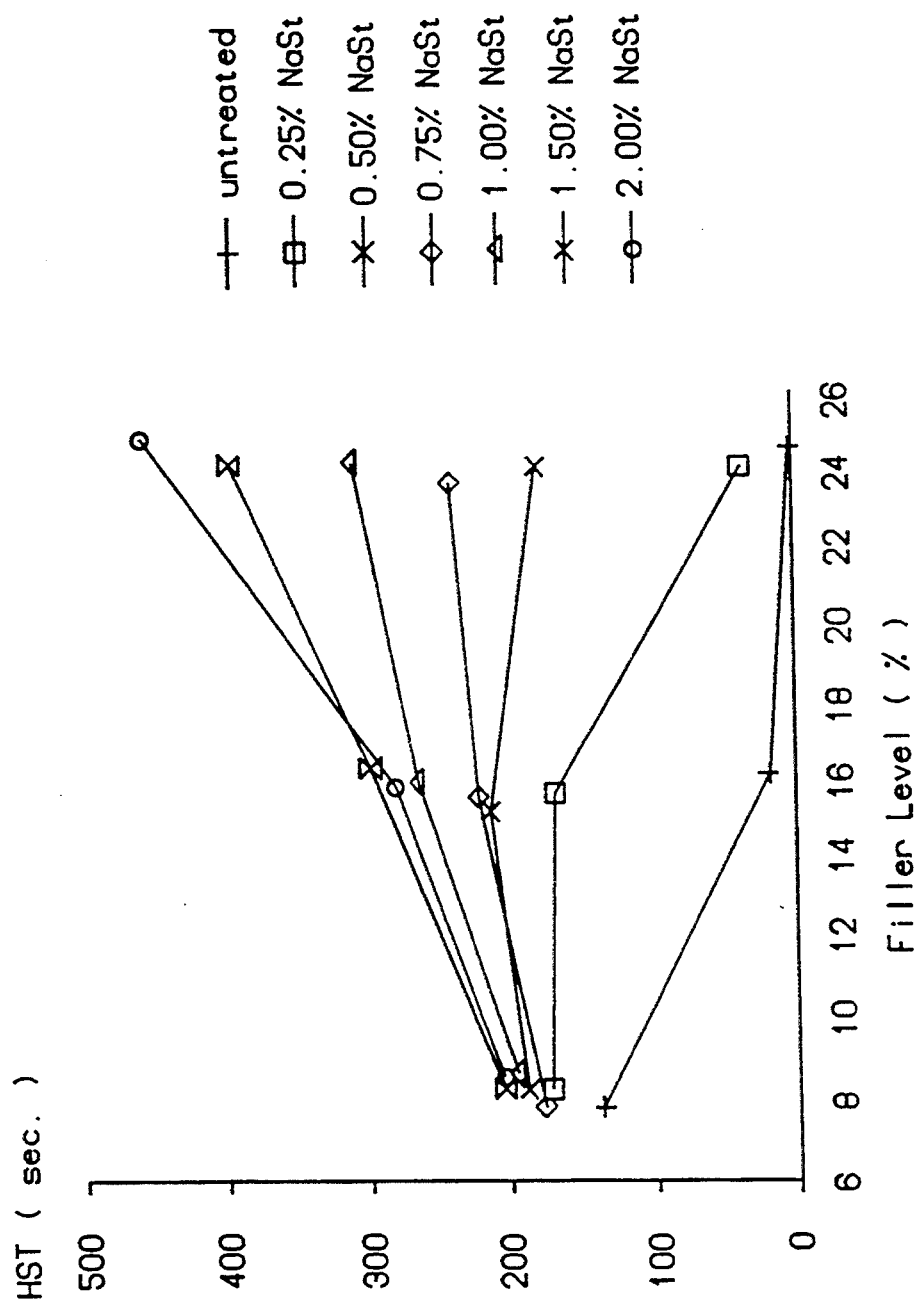

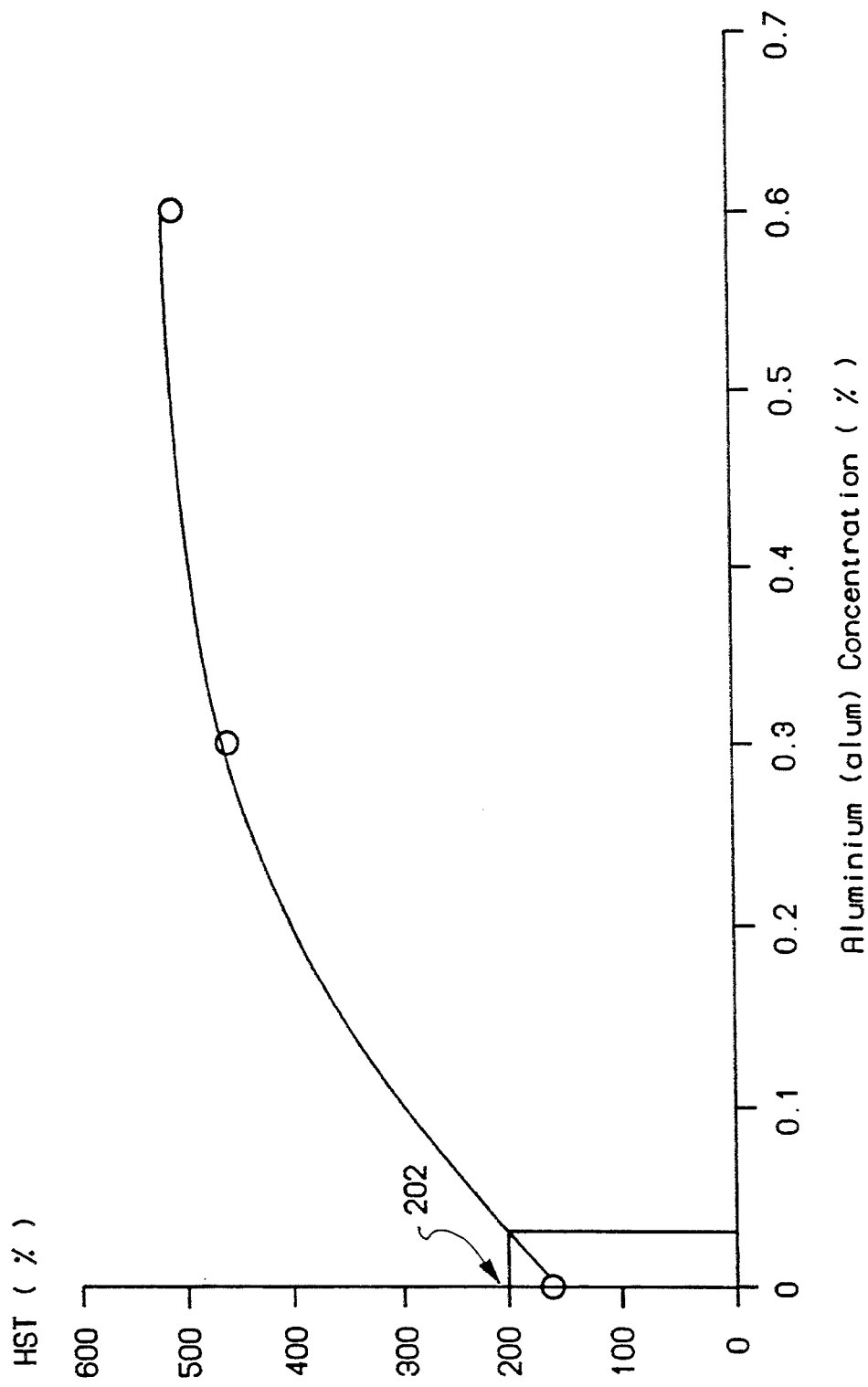

MODIFIED FILLER MATERIAL FOR ALKALINE PAPER AND METHOD OF USE THEREOF IN ALKALINE PAPER MAKING

BACKGROUND OF THE INVENTION
1.1 Technical Field

This invention relates to an improved filler material for alkaline paper and an improved alkaline paper including the improved filler material. This invention also relates to a method of preparing alkaline paper and, more particularly, to a method for improving sizing of alkaline paper. 1.2 Background Information Sizing agents are typically added to cellulose fibers during a paper making process to impart resistance to the paper to the penetration of liquid. Resistance to liquid penetration is necessary to prevent the paper from breaking down when the paper is passed through a size press starch solution prior to drying. Resistance to liquid is also necessary so that print quality can be maintained upon application of ink to the paper surface. Paper can contain sizing agents which are effective when the paper is prepared at neutral pH or alkaline pH ("alkaline paper") or at low pH ("acid paper"). Presently, sizing agents for alkaline paper that are typically used include alkyl ketene dimer and alkenyl succinic anhydride. These sizing agents covalently bond with the hydroxyl and carboxyl groups of cellulose fiber to impart resistance to liquid penetration to the paper sheet.

Fillers typically are added to cellulose fibers along with sizing agents during the paper making process. Fillers are added in order to improve, inter alia, brightness, opacity, show through and feel of the finally formed paper. Fillers used in alkaline paper making typically include finely divided inorganic particles such as clay, $TiO_2$ and calcium carbonate. Currently, precipitated calcium carbonate ("PCC") is the preferred filler for producing alkaline paper of high brightness and high quality. However, such typically used fillers detrimentally affect the sizing of alkaline paper. These fillers have higher surface areas than the cellulose fibers and so adsorb the sizing agent, requiring additional sizing agent to be used during the paper making process.

It is known to modify the surface of filler used in alkaline paper making to enhance the performance of the filler such that the paper requires the addition of substantially less wet end sizing agent. For example, U.S. Pat. No. 5,147,507 to Gill describes calcium carbonate filler having cationic resin material coated thereon. It is also stated that the paper containing the modified filler has excellent opacity and tensile strength properties.

Coating the surface of calcium carbonate particles with a fatty acid has been described wherein calcium carbonate is used as a filler for acid paper. Since untreated calcium carbonate decomposes in acidic environments, calcium carbonate cannot be used as a filler in acid papermaking unless it is acid stabilized. Modifying the surface of calcium carbonate with a fatty acid was found to acid stabilize the calcium carbonate so that it can be used as a filler for acid paper. See, for example, U.S. Pat. No. 1,839,449 to Sutermeister et al.

Japanese Patent Application Announcement Sho 59-228098 of Asahi Glass K.K. discloses an inorganic particulate filler for use in manufacturing newsprint paper under acid conditions. The filler is calcium carbonate or calcium silicate coated with stearic acid, oxalic acid or salts thereof.

Fatty acids have also been used to coat calcium carbonate for purposes other than papermaking. For example, U.S. Pat. No. 4,753,679 to Damiano et al. discloses stearic acid coated precipitated calcium carbonate for use in cement. The Kirk-Othmer "Encyclopedia of Chemical Technology", Vol. 17, page 809 (John Wiley & Sons, New York 1982) discloses synthetic calcium carbonate surface-treated with stearic acid or rosin to improve rheological properties of the calcium carbonate when used as a pigment. U.S. Pat. No. 2,385,379 to Raften discloses mixing fatty acid with calcium carbonate to coat the calcium carbonate particles. In addition to acid stabilizing the calcium carbonate, this coating allegedly reduces the adhesive requirement and oil absorption of the calcium carbonate particles, thus having utility in the manufacture of paints, enamels and the like.

Presently, a need exists to improve the sizing of alkaline paper, such that adsorption of the sizing agent by the filler is reduced.

SUMMARY OF THE INVENTION

An object of the present invention is to provide a filler material for alkaline paper that overcomes the disadvantages of the prior art.

A further object of the present invention is to provide an alkaline paper having improved sizing.

A further object of the present invention is to provide a method for improving sizing of alkaline paper.

The present invention is directed to an improved hydrophobic filler material for use in alkaline paper. Typically, material used for filler comprises finely divided particles of an inorganic material such as clay, $TiO_2$, or calcium carbonate. In the hydrophobic filler material of the present invention, filler is coated with a water soluble $C_{12}$–$C_{22}$ fatty acid salt and a metal ion. Preferred metal ions are, for example, aluminum, barium, lithium, magnesium and zinc. The fatty acid salt is present in an amount sufficient to coat substantially all of the surfaces of at least a majority of the finely divided inorganic material particles. The metal ion is present in an amount at least effective to complex with all of the fatty acid salt present.

The present invention is also directed to an improved alkaline paper. The alkaline paper comprises a hydrophobic filler material. The hydrophobic filler material comprises finely divided particles of an inorganic material such as clay, $TiO_2$ or calcium carbonate and a water soluble $C_{12}$–$C_{22}$ fatty acid salt in an amount sufficient to coat substantially all of the surfaces of at least a majority of the particles. A metal ion, preferably, aluminum, barium, lithium, magnesium or zinc, may also be present in an amount at least effective to complex all of the fatty acid present. Preferably, sizing agent is also present.

The present invention is also directed to a method for improving sizing of alkaline paper. The method comprises preparing a hydrophobic filler material and adding the filler material and optionally a sizing agent to cellulose fiber during a process for making alkaline paper. The preparation of the hydrophobic filler material comprises the steps of selecting an inorganic material in the form of finely divided particles and coating substantially all of the surfaces of a majority of the particles of the inorganic material, by contacting the particles with a $C_{12}$–$C_{22}$ fatty acid salt for a time sufficient to form a hydrophobic coating thereon. The metal ion as previously described may also be reacted with the fatty acid salt coated filler and/or with the paper making furnish in an amount at least effective to complex with all of the fatty acid salt present.

BRIEF DESCRIPTION OF THE DRAWINGS

FIG. 1 describes the test results of the HST test on the paper of Example 5 as a function of time and filler material level.

FIG. 2 describes the test results of the HST test on the paper of Example 7 as a function of time and aluminum ion concentration.

DETAILED DESCRIPTION OF INVENTION

The present invention is directed to a hydrophobic filler material for alkaline paper, an alkaline paper having improved sizing, and a method for improving sizing of alkaline paper.

The hydrophobic filler material for alkaline paper comprises finely divided particles of inorganic material having coated thereon a water soluble $C_{12}$–$C_{22}$ fatty acid salt and a metal ion, such as, for example, aluminum, barium, lithium, magnesium or zinc. The water soluble fatty acid salt is present in an amount sufficient to coat at least substantially all of the surface of a majority of the particles. The metal ion is present in an amount at least effective to complex with all of the fatty salt present. The inorganic material may be any inorganic material used for filler in alkaline paper. Suitable inorganic particles for use as a filler in alkaline paper include clay, $TiO_2$ and calcium carbonate. The preferred filler in alkaline paper is precipitated calcium carbonate. The fatty acid salt is any fatty acid salt that, when present in an amount sufficient to coat at least substantially all of the surface of a majority of the particles of the inorganic material, improves the sizing of the paper. For example, salts of $C_{12}$ to $C_{22}$ fatty acids, preferably, salts of $C_{16}$ to $C_{19}$ fatty acids, and, most preferably, salts of $C_{18}$ fatty acid, i.e., stearic acid, may be used in the present invention. The cation of the fatty acid salt is preferably an alkali metal, such as sodium or potassium. The metal ion may be derived from any metal salt of a metal which, when added in amount at least sufficient to complex all of the fatty acid salt present will impart improved sizing to the paper. Examples of suitable metal ions include aluminum, barium, lithium, magnesium and zinc.

Preferably, average particle size of the inorganic material is from about 0.1 to about 5$\mu$, preferably from about 0.2 to about 3.0$\mu$. Typically, average particle size is defined as the equivalent spherical diameter as measured by a Sedigraph 5100, manufactured by Micromeretics Co. Preferably, the inorganic material is coated with from about 0.5 to about 2.0% of fatty acid salt based on dry weight of inorganic material. Preferably, metal ion is added in an amount of from about 0.01 to about 3.0%, more preferably from about 0.02 to about 0.04% of metal ion, based on dry weight of inorganic material.

The alkaline paper comprises a hydrophobic filler material. The hydrophobic filler material disclosed above may be used, or it may only comprise the inorganic material coated with a water soluble fatty acid salt. The alkaline paper may also comprise sizing agent typically used in alkaline paper. For example, alkyl succinic anhydride and alkyl ketene dimers are the most preferred sizing agents for alkaline paper. The alkyl group of ASA or AKD's typically contain from about 1 to 20 carbons, more typically, from about 1 to 12. The inorganic material may be any inorganic material used for filler in alkaline paper and preferably, would be one of those mentioned above. The fatty acid salt is present in an amount sufficient to coat at least substantially all of the surface of a majority of the particles of the inorganic material, and is preferably a fatty acid salt mentioned above. The alkaline paper may also comprise a metal ion in at least an amount effective to complex with all of the fatty acid salt present. The metal ion may be the same as that discussed above. The filler material is advantageously present in an amount of from about 5 to about 40% by weight of the paper, preferably in an amount of from about 10 to about 25%. Sizing agent may be present in an amount of from about 0.05 to about 0.5% by weight of the paper, typically in an amount of from about 0.1 to about 0.25%. The alkaline paper may also comprise other typical additives, such as retention aids and the like.

The method for improving sizing of alkaline paper comprises the steps of preparing a hydrophobic filler material as described hereinabove and adding the filler material and, optionally a sizing agent, to cellulose fiber during a process for making alkaline paper. The step of preparing the filler material comprises the steps of selecting finely divided particles of an inorganic material and coating at least substantially all of the surface of at least a majority of the particles of the inorganic material by reacting the particles with a water soluble $C_{12}$–$C_{22}$ fatty acid salt thereof for a time sufficient to form a hydrophobic coating on at least substantially all of the surface of at least a majority of the particles.

The step of preparing the filler material preferably comprises a step of preparing a slurry of the selected finely divided particles of inorganic material prior to the coating of the surface of the particles. Preferably, the slurry comprises from about 5 to about 75% by weight solids in an aqueous phase, and most preferably, from about 10 to about 30% by weight solids in the aqueous phase. Preferably, the slurry has a pH of from about 7 to about 12, most preferably, from about 7 to about 10.

The step of preparing the filler material preferably comprises a step of preparing an emulsion of the fatty acid salt for reaction with the finely divided particles of the inorganic material of the slurry. Preferably, the emulsion has a dry weight of fatty acid salt of from about 0.1 to about 5% by weight of the inorganic material in the slurry. More preferably the emulsion has a dry weight of fatty acid metal salt of from about 0.25% to about 5%, and most preferably from about 0.5 to about 1.5% by weight of the inorganic material in the slurry. Alternatively, the fatty acid salt may be in the form of a water soluble powder. The temperature of the slurry is usually maintained between about 20° to about 80° C. Preferably, the temperature of the emulsion is from about 65° to about 80° C. When the fatty acid salt is in the form of a powder, the inorganic material slurry should have a temperature of at least 55° C. in order to insure complete dissolution of the water soluble powder.

The method for improving sizing of alkaline paper may also comprise adding to the coated filler material a metal ion. In addition, or in the alternative, the method for improving sizing of alkaline paper may comprise adding metal ion to the paper making furnish. The total amount of metal ion is added in an amount at least effective to complex with all of the fatty acid salt present.

The foregoing and other objects, features, aspects and advantages of the present invention will become more apparent from the following non-limiting examples of the present invention.

EXAMPLE 1

Preparation of PCC Modified with Sodium Stearate

Method A

A 5% sodium stearate emulsion was prepared by heating 190 g of deionized water to 85°–90° C. and adding to the heated water 10 g of sodium stearate powder while stirring. The mixture was mixed until a relatively clear emulsification is formed. The emulsification was held at 85°–90° C. An aqueous PCC slurry containing 25 grams of PCC on a dry basis was heated to at least 23° C. 5 g of the as prepared stearate emulsion was added to the slurry with sufficient mixing to maintain a moderate vortex. The resulting mix was then allowed to stand for 10 minutes. The resulting product was a stearate coated PCC containing 1% stearate based on dry weight of PCC.

Method B

An aqueous PCC slurry containing 25 grams of PCC on a dry basis was heated to at least 55° C. 0.25 g of sodium stearate powder was added to the as formed PCC slurry with sufficient mixing to maintain a moderate vortex. The resulting mix was then allowed to stand for 10 minutes. The resulting product was a stearate coated PCC containing 1% stearate based on dry weight of PCC.

Method C

A sodium stearate emulsion in butanol was prepared by adding 10 g of sodium stearate powder to 190 g of deionized water at room temperature with sufficient mixing to maintain a moderate vortex and titrating the resulting mixture with butanol until the emulsion clears. An aqueous PCC slurry containing 25 grams of PCC on a dry basis was heated to at least 23° C. The stearate emulsion was added with sufficient mixing to maintain a moderate vortex to the PCC slurry in an amount sufficient to yield a resulting product of stearate coated PCC containing 1% stearate based on dry weight of PCC.

EXAMPLE 2

Effect of Treating PCC with Sodium Stearate

Untreated PCC and sodium stearate modified PCC fillers were used to test the effect on sizing of the sodium stearate treatment against unmodified PCC.

Comparative Turbulent-Pulse Former (manufactured by Paper Research Materials, Inc.) and Formax Sheet Former (Noble and Wood type, manufactured by Adirondack Machine Corp.) handsheets (74 g/m$^2$) were prepared from a furnish of 75% bleached hardwood and 25% bleached softwood Kraft pulps beaten to 400 Canadian Standard Freeness (CSF) at 7 pH in distilled water. Shear speed on the Turbulent-Pulse Former was set at 1250 rpm utilizing a pulp furnish having a consistency of 0.12%. Pulp consistency for the Formax was 0.025%. Synthetic sizing agent (alkyl ketene dimer or alkenyl succinic anhydride) was added to the pulp at levels of from about 0.1 to about 0.25%. Cationic potato starch was added at levels of from about 0.5 to about 0.75%. Filler is added to the furnish to achieve a filler content range of from about 5 to about 25% in the finished sheets. Retention agent (high molecular weight cationic or anionic polyacrylamide) was added at about 0.025% Distilled water used throughout the process of preparing the handsheets was doped occasionally with 60 ppm calcium in the form of calcium chloride to impart hardness to the water. The sheets were pressed using a nip at a pressure of 25 psi and dried on a rotating chrome-plated drum at a temperature of 125° C.

All sheets were conditioned at 50% R.H., and 23° C.

Sizing was tested by the Hercules Size Test (HST) to measure penetration of liquid through the handsheets. The Hercules size test (H.S.T.) is the test method used to determine the degree of sizing of paper in the instant invention. The test was performed on a Hercules sizing tester model KA or KC and the test method employed is Tappi Method T-530 PM-89 (revised 1989).

The handsheet was prepared as previously described on a Turbulent-Pulse Former to have 16% filler level of PCC, 0.25% alkyl ketene dimer and 0.025% cationic polyacrylamide. The results of the HST are shown in Table 1.

TABLE 1

| EFFECT ON SIZING OF MODIFYING FILLER | |
|---|---|
| FILLERS | HST SIZING (SEC.) |
| Untreated PCC | 6 |
| Untreated PCC 3.2 lbs/ton sodium stearate added to pulp stock | 40 |
| PCC coated with 1% sodium stearate (eq. to 3.2 lbs/ton) | 470 | sizing over untreated PCC filler. Further, modification of the PCC filler material unexpectedly resulted in improved sheet sizing over adding the same amount of sodium stearate to the pulp stock and using untreated PCC.

EXAMPLE 3

Effect of Treating PCC with Various Fatty Acid Salts

Several fatty acid salts were used to test the effect on sizing of modifying the surface of PCC filler material with fatty acid salts of varying carbon chain lengths. All fatty acids were converted to salt with either NaOH or KOH before addition to the PCC. The handsheet was prepared on a Turbulent-Pulse Former as described in Example 2 and the HST test as described in Example 2 was used in this Example. The results of the HST test are shown in Table 2.

TABLE 2

| EFFECT ON SIZING OF VARYING THE CARBON CHAIN LENGTH OF THE FATTY ACID SALTS USED TO MODIFY FILLER | | |
|---|---|---|
| NO. OF CARBONS | ACID | HST (SEC.) |
| 0 | None | 1 |
| 12 | Dodecanoic (Lauric) | 36 |
| 13 | Tridecanoic | 43 |
| 15 | Pentadecanoic | 86 |
| 16 | Hexadecanoic (Palmitic) | 193 |
| 17 | Heptadecanoic | 185 |
| 18 | Octadecanoic (Stearic) | 195 |
| 19 | Nonadecanoic | 173 |
| 20 | Eicosanoic | 12 |
| 22 | Docosanoic (Behenic) | 7 |

A review of the data shows that sizing is improved using a fatty acid salt having from 12–22 carbons in the chain, with the greatest improvement in sizing shown for fatty acid salts having from 16–19 carbons in the chain.

EXAMPLE 4

Effect of Treating of PCC With Varying Amounts of Sodium Stearate

PCC treated with different amounts of sodium stearate was used to test the effect on sizing of varying the amount of sodium stearate used to modify the PCC. The handsheet was Formax (Noble and Wood) prepared as described in Example 2 and containing 0.25% alkyl ketene dimer and 0.025% cationic polyacrylamide. The results of the HST test are shown in FIG. 1.

A review of the data shows that treating the surface of the PCC with sodium stearate improves sizing as compared to untreated filler. Further review of the data shows that treatment levels of from about 0.25% to about 2% sodium stearate by dry weight of PCC provides particularly improved sizing, and optimumly, from about 0.5 to about 1% sodium stearate provides the most improved results.

EXAMPLE 5

Effect on Sizing of Adding Metal Ion to Pulp Stock

The effect on sizing of adding metal ion to the pulp stock was determined. The paper was prepared as previously described except that in some cases aluminum ion in the form of aluminum sulfate (alum) was added to the pulp stock. The handsheet was Turbulent-Pulse Former having up to about 1% alum, about 0.75% cationic potato starch, about 0.1% alkyl ketene dimer, about 0.025% anionic polyacrylamide and about 60 ppm calcium ion in $CaCl_2$ for hardness. Filler material was present in an amount of about 15% by weight of the handsheet. The results of the HST test are shown in Table 3.

TABLE 3

| EFFECT OF CATIONIC METAL ION ON SIZING | |
|---|---|
| FILLER CATIONIC METAL ION | SIZING (SEC.) |
| Untreated PCC no alum | 1 |
| Untreated PCC 10 lbs/ton alum added to pulp stock | 1 |
| Untreated PCC 3 lbs/ton (1.0%) sodium stearate and 10 lbs/ton alum added to pulp stock | 43 |
| PCC treated with 1.0% sodium stearate no alum | 52 |
| PCC treated with 1.0% sodium stearate 10 lbs/ton alum added to pulp stock | 401 |

A review of the results shows that adding aluminum ion to the pulp stock with untreated PCC does not improve sizing. In addition, adding sodium stearate to the pulp stock along with aluminum ion only modestly improves sizing. Adding sodium stearate to the PCC improves sizing further, but the most significant improvement is found where the PCC is modified with the sodium stearate and the aluminum ion is added to the pulp stock in conjunction with the sodium stearate modified PCC.

EXAMPLE 6

Effect on Sizing of Adding Cationic Metal Ion to the Modified Filler

The effect on sizing of adding cationic metal ion to sodium stearate modified PCC was determined. The handsheet was Turbulent-Pulse Former having up to about 1% aluminum ion, and having about 0.5% cationic potato starch, about 0.15% alkyl ketene dimer and about 0.025% anionic polyacrylamide. PCC was present in an amount of about 15% by weight of the handsheet. The results of the HST test are shown in Table 4 and FIG. 2.

TABLE 4

| EFFECT OF CATIONIC METAL ION ON SIZING | |
|---|---|
| FILLER CATIONIC METAL ION | HST (SEC.) |
| Untreated PCC no metal ion | 16 |
| PCC treated with 1.0% sodium stearate no metal ion | 164 |
| PCC treated with 1.0% sodium stearate 0.03% $Al^{+3}$ (from alum) added to pulp stock | 202 |
| PCC treated with 1.0% sodium stearate 0.03% $Al^{+3}$ (from alum) added to filler | 240 |
| PCC treated with 1.0% sodium stearate 0.03 $Al^{+3}$ (from polyaluminum chloride) added to filler | 320 |
| PCC treated with 1.0% sodium stearate 0.03% $Al^{+3}$ (from aluminum chloride added to filler) | 400 |

A review of the data shows that aluminum ion added to the pulp stock separate from the PCC improves sizing, but that aluminum ion in the same quantity added to the PCC modified with the sodium stearate significantly improves sizing. The preferred ratio of aluminum ion to sodium stearate was found to be from about 0.01:1 to about 0.1:1 by weight of the dry weight of PCC, with the optimum ratio found to be from about 0.02:1 to about 0.04:1.

In the most preferred embodiment of the present invention, the filler material comprises precipitated calcium carbonate treated with sodium stearate and having 0.034% aluminum ion derived from aluminum chloride.

EXAMPLE 7

Effect on Sizing of Varying Treated Filler

Several fillers both untreated and treated with sodium stearate ("NaSt") were used to test the effect on sizing of various filler materials. The handsheets were a Turbulent-Pulse Former prepared to have 0.5% cationic potato starch and 0.025% cationic polyacrylamide. The results of the HST are shown in Table 5.

TABLE 5

| EFFECT OF TREATED MATERIAL ON SIZING | | | | |
|---|---|---|---|---|
| Filler material Material | Filler material Treatment | Filler material level (%) | Internal sizing agent level (%) | HST (Sec.) |
| Ground Limestone | none | 15.5 | 0.15 | 110 |
| | 1% NaSt | 15.9 | 0.15 | 604 |
| Clay | none | 7.0 | 0.15 | 5 |
| | 1% NaSt | 7.7 | 0.15 | 735 |
| $TiO_2$ | none | 6.2 | 0.10 | 12 |
| | 1% NaSt | 5.9 | 0.10 | 1000+ |

A review of the data shows that sodium stearate treatment of other fillers commonly used in alkaline paper improves the sizing of the paper.

Although the present invention has been described in detail, it is clearly understood that the same is by way of example only and is not to be taken by way of limitation, the scope of the invention being limited only by the scope of the appended claims.

What is claimed is:

1. A hydrophobic filler material for paper comprising:
   a. finely divided particles of inorganic material;
   b. a water soluble $C_{12}$–$C_{22}$ fatty acid salt in an amount sufficient to coat substantially all of the surfaces of at least a majority of the particles; and
   c. a metal ion in an amount at least effective to complex all of the fatty acid salt.

2. The filler material of claim 1, wherein the inorganic material is clay, $TiO_2$ or calcium carbonate.

3. The filler material of claim 2, wherein the inorganic material is precipitated calcium carbonate.

4. The filler material of claim 1, wherein the fatty acid salt is derived from a $C_{16}$–$C_{19}$ fatty acid.

5. The filler material of claim 1, wherein a cation of the fatty acid salt is an alkali metal.

6. The filler material of claim 1, wherein the fatty acid salt is sodium stearate.

7. The filler material of claim 1, wherein the metal ion is aluminum, barium, lithium, magnesium or zinc.

8. The filler material of claim 7, wherein the metal ion is aluminum.

9. The filler material of claim wherein the inorganic material has a particle size of between about 0.1 and 5 microns.

10. The filler material of claim 1 wherein the fatty acid salt is present in an amount of between about 0.5 and 2% based on the weight of the inorganic material.

11. The filler material of claim 1 wherein the metal ion is present in an amount of between about 0.01 and 3% based on the weight of the inorganic material.

12. A hydrophobic filler material for paper consisting essentially of
   a. finely divided particles of inorganic material having a particle size of between about 0.1 and 5 microns;
   b. a water soluble $C_{12}$–$C_{22}$ fatty acid salt in an amount sufficient to coat substantially all of the surfaces of at least a majority of the particles, thus being present in an amount of between about 0.5 and 2% based on the weight of the inorganic material; and
   c. a metal ion in an amount of between about 0.01 and 3% based on the weight of the inorganic material to complex substantially all of the fatty acid salt.

13. The filler material of claim 12 wherein the inorganic material is clay, $TiO_2$ or calcium carbonate.

14. The filler material of claim 13 wherein the fatty acid is derived from a $C_{16}$–$C_{19}$ fatty acid.

15. The filler material of claim 14 wherein the metal ion is aluminum, barium, lithium, magnesium or zinc.

16. A method for making a hydrophobic filler material for paper which comprises
   selecting finely divided particles of an inorganic material;
   coating substantially all surfaces of a majority of the particles of the inorganic material by reacting the particles with a $C_{12}C_{22}$ fatty acid salt to form a water-soluble fatty acid coating thereon; and
   contacting the particles with a metal ion in an amount sufficient to complex substantially all of the fatty acid salt thereon.

17. The method of claim 16 which further comprises selecting the finely divided particles of inorganic material to have a particle size of between about 0.1 and 5 microns.

18. The method of claim 16 which further comprises providing the water soluble $C_{12}$–$C_{22}$ fatty acid salt in an amount of between about 0.5 and 2% based on the weight of the inorganic material.

19. The method of claim 16 which further comprises providing the metal ion in an amount of between about 0.01 and 3% based on the weight of the inorganic material to complex substantially all of the fatty acid salt.

20. The method of claim 16 which further comprises selecting the finely divided particles of inorganic material to be clay, $TiO_2$ or calcium carbonate.

21. The method of claim 20 which further comprises preparing the finely divided particles in the form of a slurry prior to modifying the surfaces thereof with the fatty acid salt.

22. The method of claim 21 which further comprises providing the slurry with about 5 to 75% by weight solids of the finely divided particles in an aqueous phase at a pH of about 7 to 12.

23. The method of claim 16 further comprises preparing the fatty acid salt in the form of a slurry prior to reaction with the finely divided inorganic particles.

24. The method of claim 21 which further comprises providing fatty acid salt in the form of a powder for reaction with the slurry of finely divided inorganic particles.

25. The method of claim 19 wherein the metal ions are added in an amount of between about 0.01 and 3% based on the dry weight of the finely divided particles.

26. The method of claim 16 wherein the dry weight of the fatty acid is between about 0.1 and 5% based on the dry weight of the finely divided particles.

27. The method of claim 16 which further comprises selecting the inorganic material to be clay, $TiO_2$ or calcium carbonate.

28. The method of claim 16 which further comprises selecting the fatty acid to be a $C_{16}$–$C_{19}$ fatty acid.

29. The method of claim 16 which further comprises selecting the metal ion to be aluminum, barium, lithium magnesium or zinc.

30. The filler material produced by the process of claim 16.

31. The filler material produced by the process of claim 17.

32. The filler material produced by the process of claim 18.

33. The filler material produced by the process of claim 19.

34. The filler material produced by the process of claim 20.

35. The filler material produced by the process of claim 21.

36. The filler material produced by the process of claim 22.

37. The filler material produced by the process of claim 23.

38. The filler material produced by the process of claim 24.

39. The filler material produced by the process of claim 25.

40. The filler material produced by the process of claim 26.

41. The filler material produced by the process of claim 27.

42. The filler material produced by the process of claim 28.

43. The filler material produced by the process of claim 29.

* * * * *